United States Patent
Hirose et al.

(10) Patent No.: US 7,008,003 B1
(45) Date of Patent: Mar. 7, 2006

(54) POCKET STRUCTURE IN INTERIOR TRIM

(75) Inventors: Toshikazu Hirose, Dublin, OH (US); J. Marc Palmer, Columbus, OH (US); Daisuke Aoshima, Kanagawa (JP)

(73) Assignees: Honda Giken Kogyo Kabushiki, Tokyo (JP); Kasai Koygo Co., Ltd., Kanagawa (JP)

( * ) Notice: Subject to any disclaimer, the term of this patent is extended or adjusted under 35 U.S.C. 154(b) by 0 days.

(21) Appl. No.: 10/169,945

(22) PCT Filed: Feb. 2, 2000

(86) PCT No.: PCT/JP00/00570

§ 371 (c)(1),
(2), (4) Date: Jul. 11, 2002

(87) PCT Pub. No.: WO01/56834

PCT Pub. Date: Aug. 9, 2001

(51) Int. Cl.
*B60J 5/00* (2006.01)

(52) U.S. Cl. .................................... 296/146.7
(58) Field of Classification Search ............. 296/146.7, 296/37.13; 24/289, 292, 297
See application file for complete search history.

(56) References Cited

U.S. PATENT DOCUMENTS

| | | | | |
|---|---|---|---|---|
| 4,388,355 A | * | 6/1983 | Ikemizu | 428/31 |
| 5,202,172 A | * | 4/1993 | Graf | 428/100 |
| 5,433,498 A | * | 7/1995 | Ishiwata | 296/39.1 |
| 6,095,594 A | * | 8/2000 | Riddle et al. | 296/191 |
| 6,116,672 A | * | 9/2000 | Cannon et al. | |
| 6,308,488 B1 | * | 10/2001 | Hoshino | |
| 2005/0054229 A1 | * | 3/2005 | Tsuya et al. | 439/280 |

FOREIGN PATENT DOCUMENTS

| | | |
|---|---|---|
| JP | 60-64160 | 5/1985 |
| JP | 3-8919 | 1/1991 |
| JP | 5-94010 | 12/1993 |
| JP | 11-240388 | 9/1999 |

* cited by examiner

*Primary Examiner*—H. Gutman
(74) *Attorney, Agent, or Firm*—Dickstein Shapiro Morin & Oshinsky LLP (57) ABSTRACT

A pocket (P) structure formed by providing a pocket opening (41) in a trim main body and installing a case-shaped pocket cover (50) having an upper opening (51) on the rear side of the pocket opening (41) is provided. The front wall part of the pocket (P) is formed in a double wall structure comprising the trim main body (40) and a front wall (55) of the pocket cover (50). The trim main body (40) and the front wall (55) of the pocket cover (50) are provided with locking holes (44) and locking pieces (56), respectively, so as to eliminate iron clips in order to reduce cost and simplify a recycle operation. Patch ribs (45, 57) are installed on opposed surfaces of the rear surfaces of the trim main body and the front wall (55) of the pocket cover (50) so as to provide a good grasp at the time the pocket cover is grasped.

7 Claims, 7 Drawing Sheets

PRIOR ART

FIG. 9

PRIOR ART

FIG. 10

PRIOR ART

FIG. 11

PRIOR ART

POCKET STRUCTURE IN INTERIOR TRIM

FIELD OF THE INVENTION

The present invention relates to a pocket structure disposed on an automotive interior trim such as a door trim of sedan type, hardtop type, and other type automobiles. The present invention also relates to a luggage side trim for wagons, and in particular, to a pocket structure in an interior trim that is excellent in rigidity, good for grasping, and suitable for recycling.

BACKGROUND OF THE INVENTION

Figure 8:
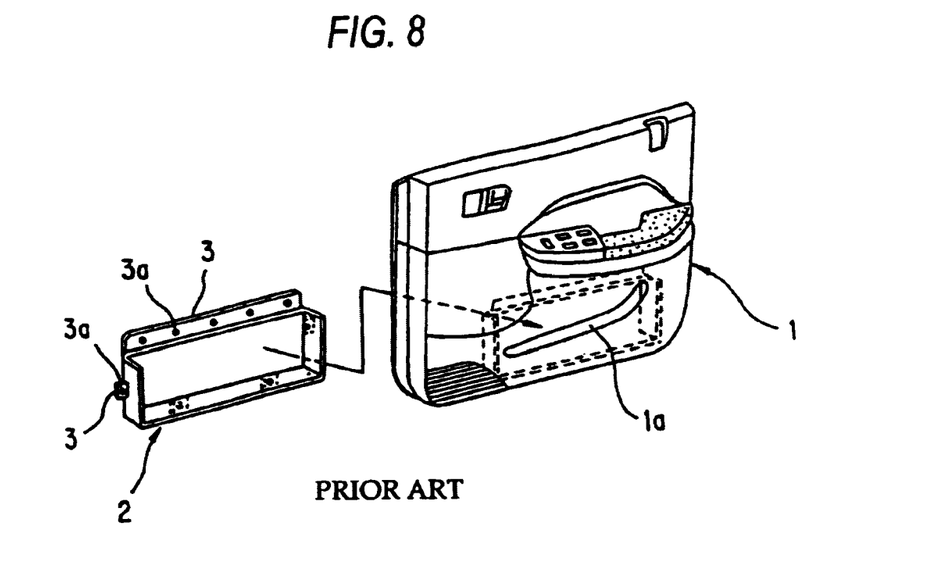
FIG. 8 is a schematic representation of one configuration showing a conventional door trim having a door pocket.

In general, pockets capable of accommodating in-cabin items are often installed below surfaces of door trims of sedan type, hardtop type, and other type automobiles, or below surfaces of luggage side trims in one-box cars (i.e., vans). A conventional door pocket installed in the door trim will be described. As shown in FIG. 8, a pocket opening 1a is provided in a lower side of the surface of a door trim 1, and a pocket back cover 2 made of a resin molding is fitted to an inner side surface of the pocket opening 1a to constitute the door pocket of the door trim 1.

In order to fit this pocket back cover 2 to the inner surface of the door trim 1, fitting pieces 3 are disposed at appropriate intervals along both side edges and a lower edge of the pocket back cover 2, and fitting holes 3a are provided in these fitting pieces 3.

Figure 9:
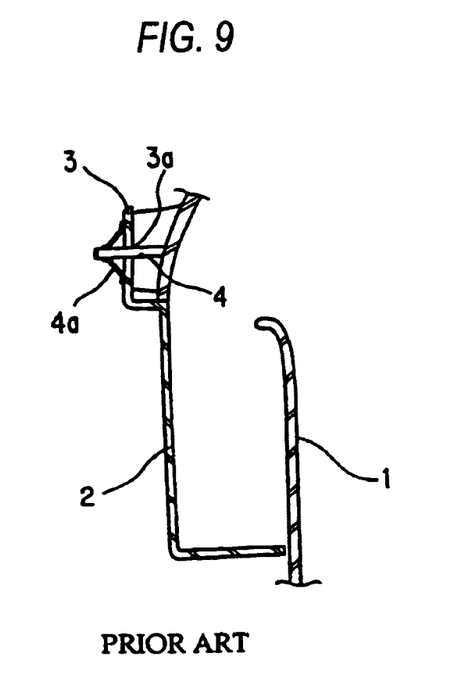
FIG. 9 is a sectional view of the conventional door pocket.

A fitting boss 4 protrudes from the inner surface of the door trim 1 corresponding to the fitting hole 3a of the fitting piece 3. As shown in FIG. 9, the fitting boss 4 is inserted into the fitting hole 3a, and is affixed by fitting a fixing piece 4a, such as a push-on fixing piece, to one side of the fitting boss 4.

Thus, in each door pocket, a back surface, both side surfaces, and a bottom surface are formed in the pocket back cover 2, and a front surface is formed in the door trim 1. When an open door is closed by a vehicle occupant, for example, a front edge part of the pocket opening 1a is often grasped by hand to close the door. In this situation, the door is less rigid since the front wall of the door pocket is thin-walled, and it is easy to induce deformation. Upon grasping the door, therefore, the feeling is not good, i.e., not substantial, because of the lack of rigidity.

Figure 10:
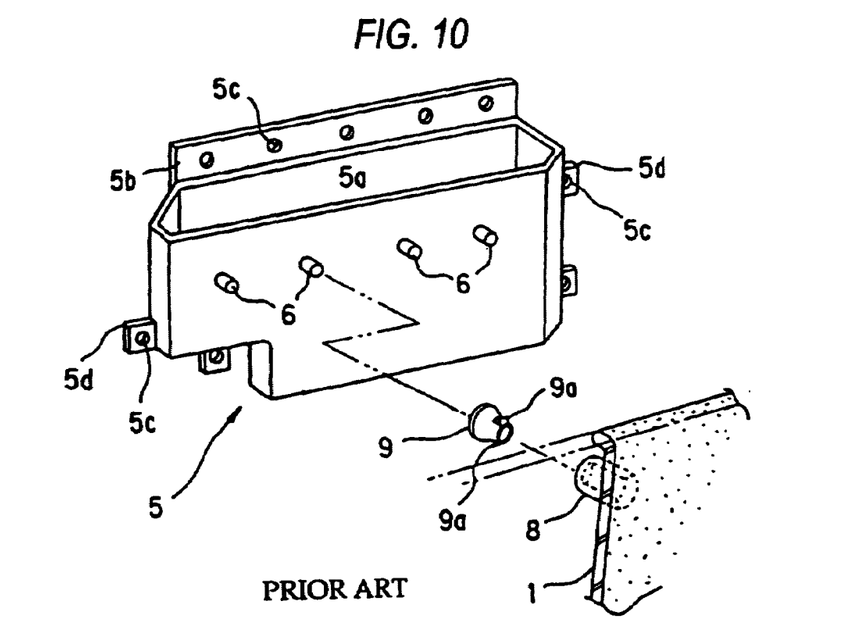
FIG. 10 is a schematic representation of the configuration of the conventional door pocket.

In order to solve these problems, a case-shaped pocket cover 5 with a top surface opened is used in a manner as shown in FIG. 10. This pocket cover 5 has an opening 5a substantially equal to the pocket opening 1a provided in the door trim 1, and a flange 5b is provided on a rear edge of the opening 5a. Fitting holes 5c are opened in the flange 5b, a fitting piece 5d is disposed on both sides of the pocket cover 5, and fitting holes 5c are provided in the fitting pieces 5d.

A plurality of bosses 6 protrude from an upper part of the front surface of the pocket cover 5 at appropriate intervals along the horizontal direction.

A boss 7 for ultrasonic welding protrudes from an inner surface of the door trim 1 corresponding to the fitting hole 5c, and a hollow cylindrical boss 8 protrudes from the door trim 1 corresponding to the boss 6 of the pocket cover 5.

Figure 11:
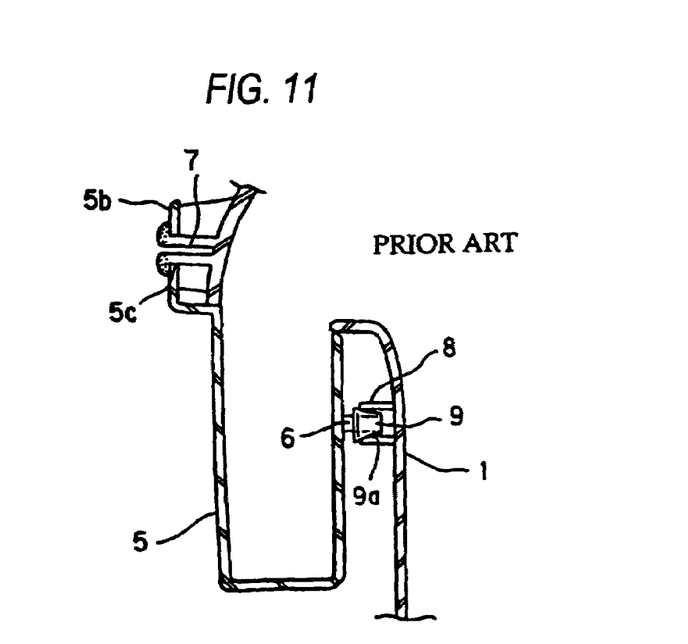
FIG. 11 is a sectional view showing the fitting of the conventional door pocket shown in FIG. 10 to the door trim.

Regarding an attaching structure of the pocket cover 5, the boss 7 for ultrasonic welding of the door trim 1 is inserted into the fitting hole 5c of the pocket cover 5 as shown in FIG. 11, and welded and affixed thereto. The pocket cover 5 is firmly affixed to the inner side surface of the pocket opening 1a of the door trim 1 by attaching iron clips 9, fitted to the boss 6 disposed on the front wall of the pocket cover 5, to an inner circumferential surface of the boss 8 of the door trim 1.

However, the following problems still occur even in a case of using the above-described case-shaped pocket cover 5.

Since the iron clips 9 are used in conjunction with the door trim 1 and the pocket cover 5 (which are resin moldings), recycling of the door trim 1 cannot be performed unless the iron clips 9 are removed. Surplus recycle steps are thus required, the cost for the iron clips 9 is increased, and thereby the product cost increases.

In addition, when the pocket cover 5 is fitted to the inner surface of the door trim 1, locking claws 9a of the iron clips 9 are advanced while moving along the inner surface of the boss 8. Thus, during the fitting, no "click stop" feeling can be detected to ensure that the fitting has been effected. Thus, reliable fitting of the pocket cover 5 cannot be easily checked, and a problem of insufficient fitting reliability also exists.

Accordingly, an object of the present invention is to provide a pocket structure disposed on the interior trim such as the door trim, that provides a good, i.e., substantial, grasp when the front edge part of the pocket opening is grasped, that is less easily deformed in an interior component using a pocket cover made of a case-shaped resin molding, and that is also easily recyclable, inexpensive, and capable of increasing the assembly reliability of the pocket cover.

SUMMARY OF THE INVENTION

The present invention provides a pocket structure in an interior trim having a pocket opening provided in a trim main body and a case-shaped pocket cover installed on a rear side of the pocket opening, wherein a plurality of locking pieces protrude from an outer surface of a front wall of the pocket cover, locking seats having locking holes capable of locking the locking pieces protrude in an embossed manner on a rear side of the trim main body, and the front wall of the pocket cover is affixed to an inner side surface of the trim main body by locking the locking pieces to the locking holes.

Conventional iron clips can be omitted, trim components can be easily recycled, and the assembly reliability of the pocket cover can be increased by the locking action.

In the present invention, patch ribs abutting from opposite sides are disposed on at least one of the front wall parts of the pocket, or the locking seat of the trim main body.

Thus, a feeling of rigidity when grasping a front edge part of the pocket opening can be increased.

In addition, the present invention is applied to the door trim main body internally fitted to the door panel.

A door can be smoothly opened/closed by grasping an opening edge part of the pocket when the pocket is applied to the door trim main body.

DETAILED DESCRIPTION OF THE INVENTION

The present invention will be described in more detail with reference to the attached drawings.

Figure 1:
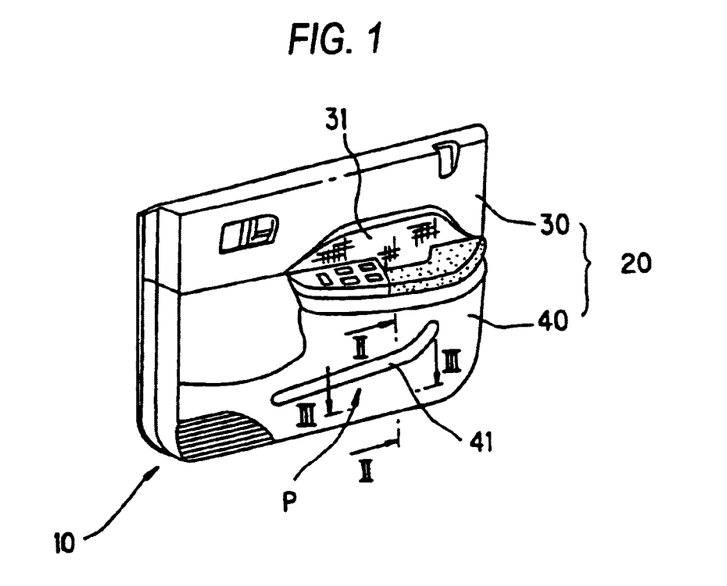
FIG. 1 is a perspective view of an automotive door trim with a pocket structure in accordance with the present invention.
Figure 2:
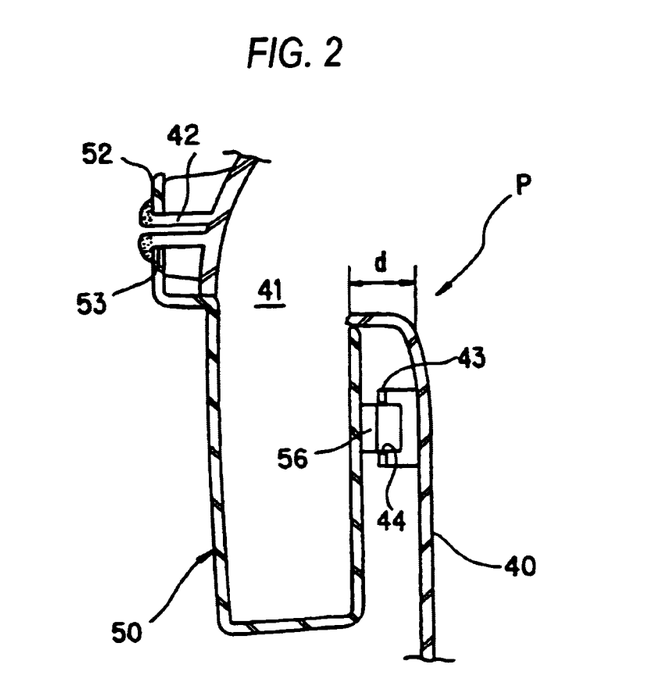
FIG. 2 is a sectional view through the line II—II in FIG. 1.
Figure 3:
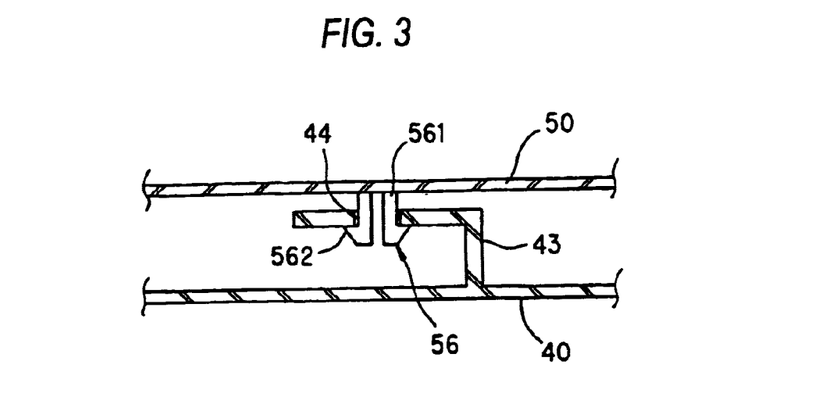
FIG. 3 is a sectional view through the line III—III in FIG. 1.
Figure 4:
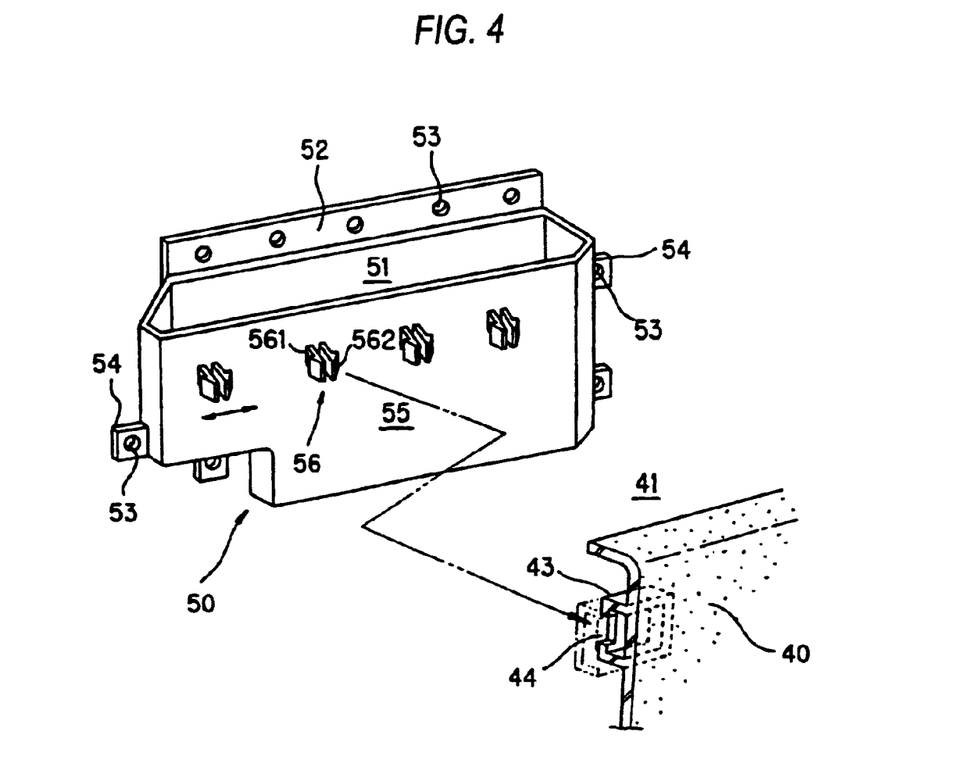
FIG. 4 is a schematic representation showing the configuration of a door pocket in the automotive door trim shown in FIG. 1.
Figure 5:
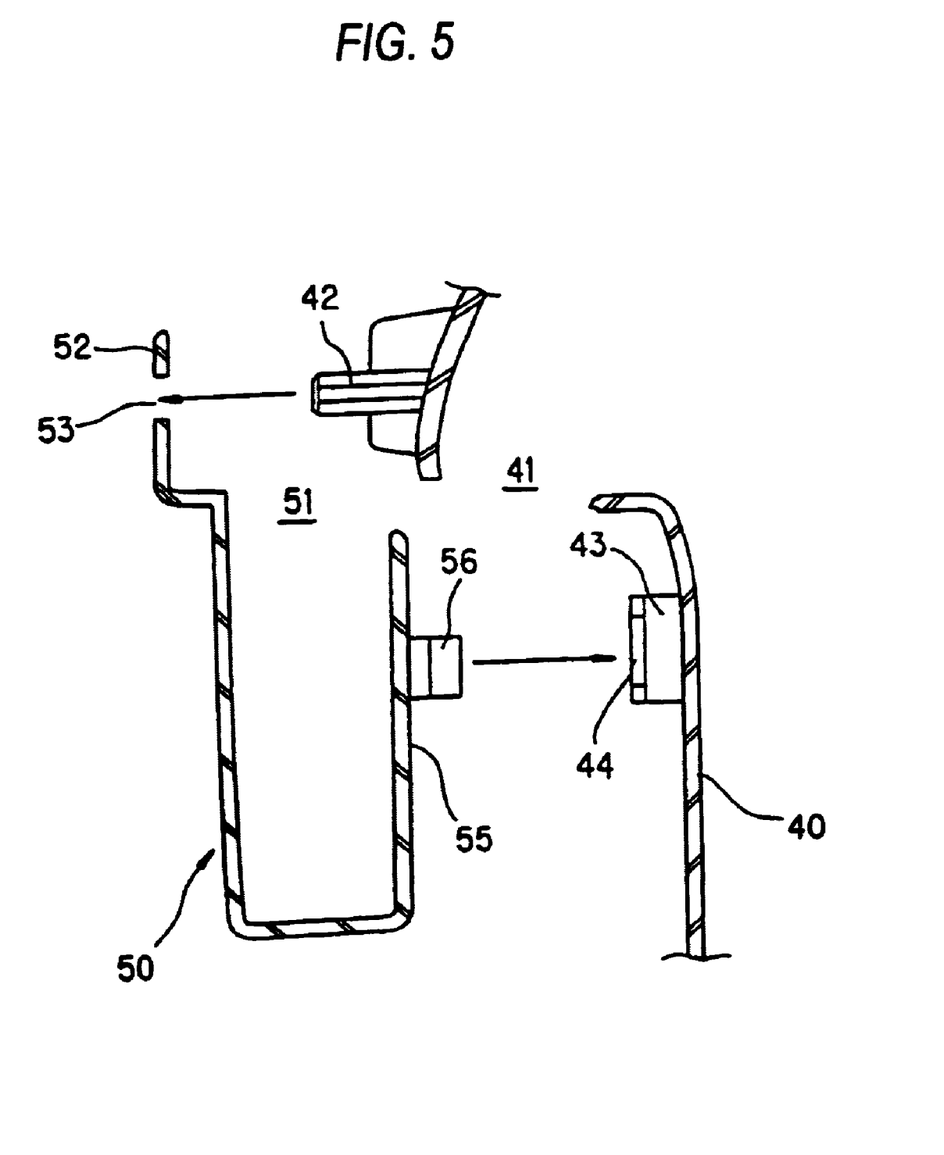
FIG. 5 is a schematic representation showing a condition of the pocket cover shown in FIG. 4 fitted to the door trim main body.

FIG. 1 is a perspective view of an automotive door trim with a pocket structure in accordance with the present invention applied thereto. FIGS. 2 and 3 are sectional views showing each configuration of the door pocket part in the automotive door trim. FIG. 4 is a schematic representation showing the configuration of the door pocket part. FIG. 5 is a schematic representation showing the attachment of the pocket cover to form the door pocket.

In FIG. 1, the automotive door trim 10 is formed by fitting a door inner handle, a door lock knob, and various kinds of switches to the door trim main body 20. The door trim main body 20 comprises two separate upper and lower bodies, i.e., an upper door trim 30 and a lower door trim 40.

Regarding the configuration of the upper door trim 30 and the lower door trim 40, the upper door trim 30 is formed of a molding of mold-pressed pp (polypropylene) resin with talc mixed therein. A cloth 31 is press-affixed to an upper portion of a joining part with the lower door trim 40, i.e., to an intermediate contact part therewith.

The lower door trim 40 is formed of a molding of mold-pressed polypropylene resin with talc mixed therein, or an injection-molding of mold-pressed polypropylene resin with talc mixed therein. A contrast effect in appearance is preferably provided between the upper door trim 30 and the lower door trim 40 in order to improve the design property of the door trim 10.

In a door pocket P disposed on the door trim main body 20, a pocket opening 41 is provided in the lower door trim 40, and a pocket cover 50 shown in FIG. 4 is fitted to a rear side of a pocket opening 41.

The pocket cover 50 is formed of an injection-molded polypropylene resin. In more detail, a case-shaped molding is formed having an upper opening 51. A flange 52 extending in a horizontal direction at a predetermined width is formed on a rear side of the upper opening 51. Fitting holes 53 are provided in flange 52 at predetermined pitches. Fitting pieces 54 are formed to protrude from both sides of the pocket cover 50, and fitting holes 53 are also provided in fitting pieces 54.

In addition, four locking pieces 56 protrude from a front wall 55 of the pocket cover 50. The locking pieces 56 have a substantially and outwardly arrow-head shaped locking claw 562 on each tip of a pair of plate-like leg pieces 561 facing each other. The locking pieces 56 are flexible along the direction of an arrow "↔" as shown in FIG. 4.

Bosses 42 for ultrasonic welding protrude from the rear side of the door trim main body 20 (the lower door trim 40) to which pocket cover 50 is fitted at the position corresponding to each fitting hole 53 of the pocket cover 50 (refer to FIG. 2). Embossed locking seats 43 are integrally formed on a rear side of the lower door trim 40 corresponding to four locking pieces 56, and a rectangular locking hole 44 is formed in the locking seats 43.

As shown in FIG. 5, the bosses 42 for ultrasonic welding of the lower door trim 40 are inserted into the fitting holes 53 in the pocket cover 50. The pocket cover 50 can be initially fitted to the rear side of the lower door trim 40 by locking the four locking pieces 56 disposed on the front wall 55 of the pocket cover 50 into locking holes 44 in the locking seats 43 embossed in the rear side of the lower door trim 40. The pocket cover 50 can then be reliably and firmly affixed to the rear side of the lower door trim 40 by ultrasonically welding the tips of the bosses 42.

Figure 5A:
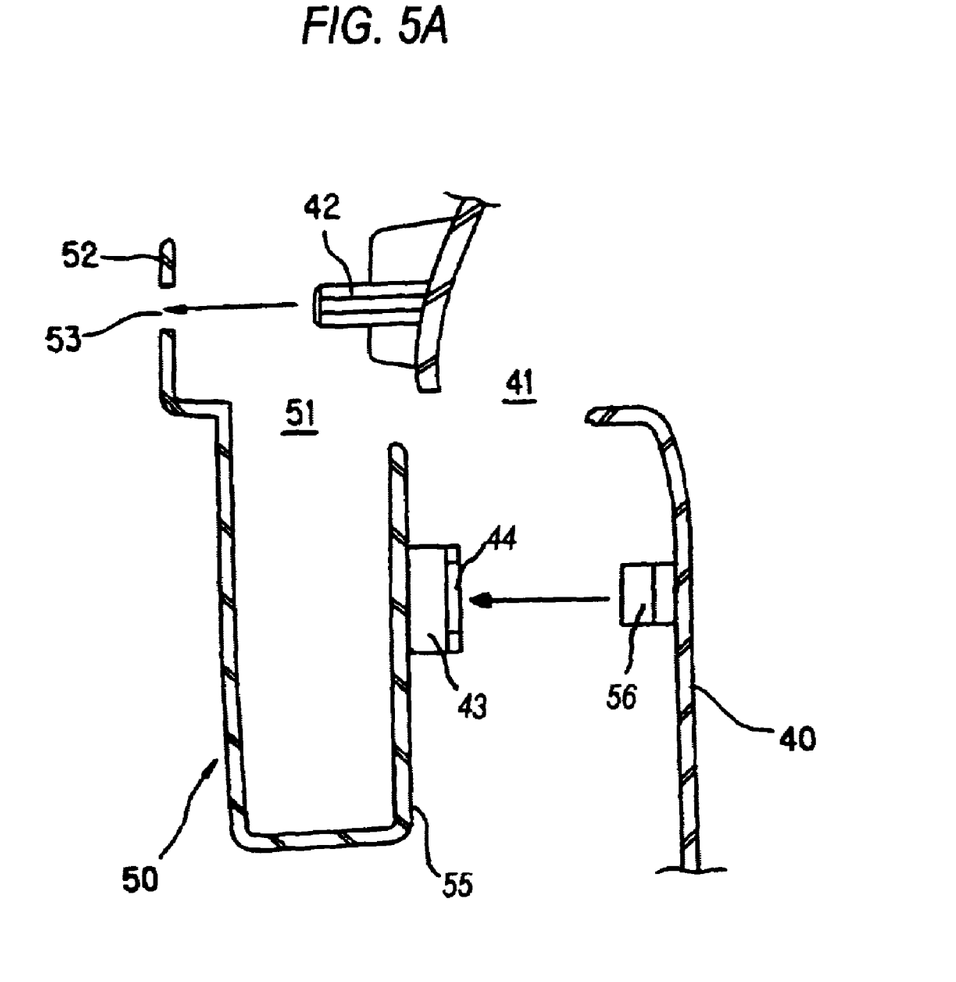
FIG. 5A is a schematic representation showing an outer trim main body provided with flexible locking pieces and an inner surface provided with locking seats and locking holes.

FIG. 5A shows the outer trim main body provided with flexible locking pieces (numeral 56) and the inner surface provided with locking seats (numeral 43) and locking holes (numeral 44).

Thus, as shown in FIG. 2, when the pocket cover 50 has been attached, the front wall of the door pocket P forms a double structure comprising the lower door trim 40 and the front wall 55 (FIG. 5) of the pocket cover 50. The rigidity of door pocket P is thus reinforced, and the dimension denoted by the symbol "d" in FIG. 2 is of the desired thickness. As a result, the occupant's feel upon grasping the front edge part of the pocket opening 41 when opening/closing the door is good, i.e., substantial, in view of the enhanced rigidity, and the door pocket can fully withstand the opening/closing operation of the door.

In addition, conventional iron clips are no longer necessary for fitting the pocket cover 50, and thus, the cost associated with iron clips can be eliminated. In particular, the need to remove iron clips from trim components prior to a recycle operation can be eliminated. The invention thus facilitates recycling, and the recycling cost can also be considerably reduced.

Further, by using the case-shaped pocket cover 50, the rigidity of the front wall part of the door pocket P as described above is reinforced. The feel upon grasping is good, i.e., substantial, and deformation of the opening of the door pocket P is thus prevented. An impact absorbing function is also provided because the pocket cover 50 is case-shaped. This means that the lower side of the pocket opening 41 of the lower door trim 40 is not deflected even when pressed to the panel side. Because of the case-shaped pocket cover 50, the absorption of energy in the event of fracture can also be expected for an excessive impact. Thus, the impact absorption function is excellent.

Figure 6:
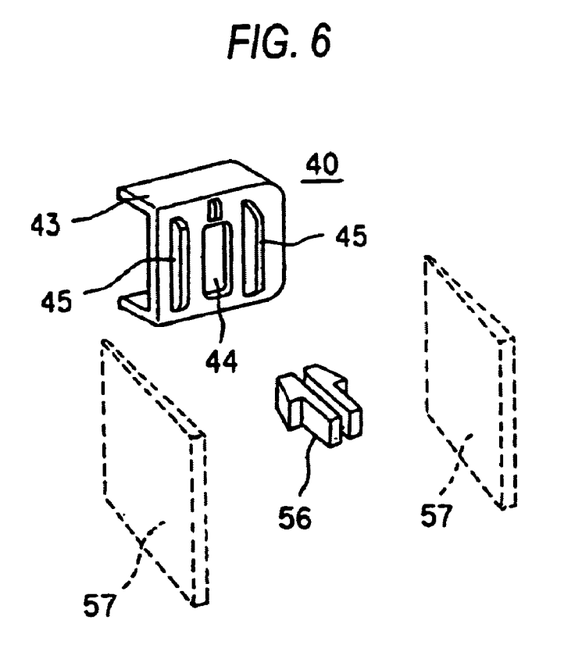
FIG. 6 shows another embodiment of the pocket structure in accordance with the present invention, and is a schematic representation showing a structure for fitting the pocket cover to the door trim main body.

In addition, as shown in FIGS. 4–6, in fitting the pocket cover 50, the locking claw 562 at the tip part of the locking piece 56 is deflected inwardly when the locking piece 56 of the pocket cover 50 is inserted into the locking hole 44 in the locking seat 43 on the lower door trim 40 side. The locking claw 562 is then extended over the edge of the locking hole 44. In this manner, a "click stop" feeling is detected as an indication that the fitting has been effected. Thus, the initial fitting of the pocket cover 50 can be easily checked, and the assembly reliability can be improved. Since the need for iron clips is eliminated, the boss is not removed by the claws of the iron clips. Thus, any small positional error requiring correction can be addressed by the flexibility of the locking piece 56 should the position of the pocket cover 50 be initially slightly out of alignment.

In the above-described embodiment, by employing the case-shaped pocket cover 50, the front wall part of the door pocket P has the double wall structure. Thus, the rigidity thereof can be improved, and the feel upon grasping the front edge of the door pocket P is good, i.e., substantial, in view of the enhanced rigidity. In addition, the impact absorption function is excellent, the cost can be reduced, the recycle operation is simplified by virtue of eliminating the need for iron clips, and the assembly workability is improved, thus resulting in a large number of practical advantages.

Figure 7:
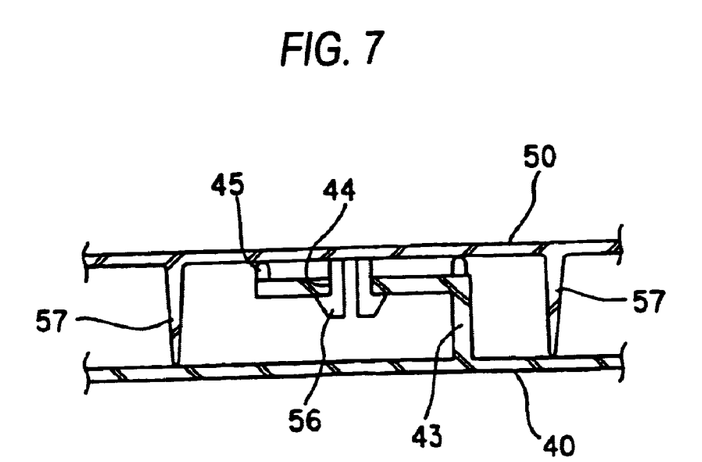
FIG. 7 is a sectional view of the pocket cover shown in FIG. 6 fitted to the door trim main body.

FIGS. 6 and 7 show another embodiment of the present invention. On both sides of the locking hole 44, patch ribs 45 facing the pocket cover 50 protrude from the locking seats 43 disposed on the lower door trim 40. Patch ribs 57 facing the inner surface of the lower door trim 40 protrude from the front wall 55 of the pocket cover 50 between the locking pieces 56.

As shown in FIG. 7, when the pocket cover 50 is affixed to the lower door trim 40, the patch ribs 45 and 57 are abutted to the member with which they are in contact. The thickness d of the front wall part of the door pocket P is not changed even when the front edge part of the pocket opening 41 is grasped by an occupant. In addition, the rigidity of the opening edge is reinforced, the predetermined thickness can be constantly maintained, and the door can be smoothly opened/closed.

Increased rigidity can be attained by employing either of the patch ribs 45 or 57, and can be attained to an even greater extent by utilizing both of patch ribs 45 and 57.

The above embodiment pertains to a door pocket structure with the pocket cover 50 assembled with the door trim main body 20 comprising the separate bodies of the upper door trim 30 and the lower door trim 40. However, in another possible embodiment, the door trim main body 20 may be integrally formed, and the invention can pertain to the pocket structure of a luggage side trim of a one-box car or the like in addition to the door trim 10.

The pocket structure in the interior trim of the present invention is useful for the door pocket structure provided on the door trim of automobiles and for the pocket structure provided on the luggage side trim of one-box cars. In particular, the invention is particularly suitable for the door pocket structure used for hand-grasping when opening/closing a door.

The invention claimed is:

1. A vehicle pocket structure comprising:
   a front, double wall structure comprising;
      a pocket cover having first and second sidewalls and defining a pocket opening;
      a door trim main body connected to a surface of one of said sidewalls of said pocket cover such that one end of said door trim main body operates as an upper corner of said pocket opening of said pocket structure,
      a locking mechanism operable to connect said one of said sidewall surface with said door trim main body, wherein one of said one surface and said door trim main body is provided with a pair of plate-like leg pieces, each of said leg pieces having a locking claw, and the other is provided with locking seats and locking holes, said leg pieces protruding toward and accommodating said locking seats, and
      at least first and second patch ribs protruding from one of said one surface and said door trim main body, wherein said first and second patch ribs abut against the other of said one surface and said door trim main body when said locking seats are accommodated within said leg pieces.

2. The pocket structure of claim 1, wherein said locking pieces are provided on said one surface.

3. The pocket structure of claim 1, wherein said locking pieces are provided on said door trim main body.

4. The pocket structure of claim 1, wherein said first and second patch ribs protrude from said one surface.

5. The pocket structure of claim 4, wherein third and fourth patch ribs protrude from said door trim main body and abut said one surface when said locking seats are accommodated within said leg pieces.

6. The pocket structure of claim 1, wherein said first and second patch ribs protrude from said door trim main body.

7. The pocket structure of claim 6, wherein third and fourth patch ribs protrude from said one surface and abut said door trim main body when said locking seats are accommodated within said leg pieces.

* * * * *